United States Patent
Hong et al.

(10) Patent No.: US 6,867,823 B2
(45) Date of Patent: Mar. 15, 2005

(54) PROCESS AND STRUCTURE FOR REPAIRING DEFECT OF LIQUID CRYSTAL DISPLAY

(75) Inventors: Hong-Jye Hong, Hsinchu (TW); George Hsu, Taoyuan-Shien (TW); Chih-Wei Wang, Hsinchu (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 09/860,945

(22) Filed: May 17, 2001

(65) Prior Publication Data

US 2002/0018175 A1 Feb. 14, 2002

(30) Foreign Application Priority Data

Aug. 11, 2000 (TW) .................................... 89213998 U
Aug. 17, 2000 (TW) .................................... 89116661 A

(51) Int. Cl.[7] .......................................... G02F 1/1333
(52) U.S. Cl. ........................................ 349/54; 349/192
(58) Field of Search ............................ 349/192, 54, 55, 349/139, 147, 143

(56) References Cited

U.S. PATENT DOCUMENTS 6,753,935 B2 * 6/2004 Wu .............................. 349/54

* cited by examiner

Primary Examiner—Tarifur R. Chowdhury
Assistant Examiner—Thoi V. Duong

(57) ABSTRACT

A process for repairing defects applied in producing a liquid crystal display, wherein the liquid crystal display includes a pixel array formed by a plurality of scanning lines crossing with a plurality of data lines. The process includes steps of providing an essential repair line located on one side of the pixel array, welding a first intersection point of a defecting data line and the essential repair line and a second intersection point of a normal data line adjacent to the defecting data line and the essential repair line by a first laser to achieve electrical connection, and cutting a first breaking point and a second breaking point of the essential repair line by a second laser to achieve a broken circuit, wherein the first and second intersection points are located two sides of a line segment constructed by the first and second intersection points respectively.

9 Claims, 6 Drawing Sheets

PROCESS AND STRUCTURE FOR REPAIRING DEFECT OF LIQUID CRYSTAL DISPLAY

FIELD OF THE INVENTION

The present invention relates to a process and a structure for repairing defects, and more particularly to a process and a structure for repairing defects of a thin film transistor liquid crystal display (TFTLCD).

BACKGROUND OF THE INVENTION

Along with the producing technology development, the liquid crystal display has been become a widely used display device. The working principle of the liquid crystal display is based on the phenomenon that the alignment condition of liquid crystal molecules is changed by applying an electrical field to change the path of light passing through the liquid crystal molecules and the display effect of changing in light and shade is further achieved.

FIG. 1 is a diagram illustrating a unit circuit block of a thin film transistor liquid crystal display according to the prior art. The thin film transistor 11 is controlled by the voltage Vs of scanning line for switching the statuses of "on" and "off". The voltage Vd of the data line is applied to a liquid crystal 12 located between a pixel electrode 131 and a common electrode 132 for changing the alignment condition of the liquid crystal 12 and further controlling the light penetrating degree of the liquid crystal molecules 12. Thus, the emissive intensity from a light source 14 at the back of the liquid crystal display will occur change while the light reaches to the eyes of a user for achieving the display effect of the changing in light and shade. The storage capacitance 15 is used for reinforcing the device characteristics.

The thin film transistor liquid crystal display is formed by producing a lot of arrays constructed by the unit circuit as shown in FIG. 1 on a display panel. However, some defects in the data or scanning lines are possible to occur by mistake or through carelessness. For ruling out the defects, a plurality of annular repair lines around an array are established in the layout of the current thin film transistor liquid crystal display. FIG. 2 is a top view illustrating a structure having a plurality of annular repair lines around the array of the thin film transistor liquid crystal display according to the prior art. As shown in FIG. 2, the array 21 has five annular repair lines 201, 202, 203, 204 and 205 therearound. When a data line 22 of the array 21 has a breaking point occurred, the regions 2011 and 2012 are welded and the regions 2013 and 2014 are cut by laser for achieving the repairing effect.

In addition, FIG. 4 is a schematic view illustrating a repair structure for a liquid crystal display according to a prior art. When a defect is discovered, a insulation layer 43 between a first metal layer 41 and a second metal layer 42 is needed to be destroyed by a laser. Subsequently, the first metal layer 41 is burned to melt, and the first metal layer 41 is welded with the second metal layer 42 to accomplish the repair.

Because the melting point of aluminum is in the range from about 550° C. to 660° C., aluminum is beneficial to the performance of welding. The first metal layer 41 is usually made of aluminum. However, due to the low melting point of aluminum, aluminum is easily splashed around when the welding is performed by the laser. Furthermore, a short circuit, a broken circuit, or a Schottky contact is happened to a contact point.

Thus, using the annular repair lines for repairing the defects according to the prior art has the following disadvantages:

(1) The signal transmission line is too long after being repaired, so a serious problem of RC time delay is easy to occur;

(2) A large area of panel is required to move for performing the repairing action, so the production efficiency will be decreased; and (3) The structure of the repair lines according to the prior art occupies much area of panel, which decreases the utility rate of glass substrates.

(4) The structure of the repair lines according to the prior art easily causes a short circuit, a broken circuit, or a Schottky contact in a contact point.

Therefore, the purpose of the present invention is to develop a method to deal with the above situations encountered in the prior art.

SUMMARY OF THE INVENTION

It is therefore an object of the present invention to propose a process for repairing defects of the liquid crystal display to efficiently shortening a signal transmission line.

It is therefore another object of the present invention to propose a process for repairing defects of the liquid crystal display to reduce the RC time delay phenomenon.

It is therefore an additional object of the present invention to propose a process for repairing defects of the liquid crystal display to reduce the moving distance of the laser during repairing.

It is therefore an additional object of the present invention to propose a process for repairing defects of the liquid crystal display to reduce the occupied area of the repair line for efficiently increasing the utility rate of glass substrate in the liquid crystal display.

According to the present invention, there is proposed a process for repairing defects applied in producing a liquid crystal display, wherein the liquid crystal display includes a pixel array formed by a plurality of scanning lines crossing with a plurality of data lines. The process includes steps of (a) providing an essential repair line located on one side of the pixel array, (b) welding a first intersection point of a defecting line and the essential repair line and a second intersection point of a normal line adjacent to the defecting line and the essential repair line by a first laser to achieve electrical connection, and (c) cutting a first breaking point and a second breaking point of the essential repair line by a second laser to achieve a broken circuit, wherein the first and second intersection points are located two sides of a line segment constructed by the first and second intersection points respectively.

Preferably, both the defecting line and the normal line are data lines. Certainly, both the defecting line and the normal line can be scanning lines.

Preferably, the first laser has a wavelength of 1064 nm and the second laser has a wavelength of 532 nm.

Preferably, the essential repair line includes a first metal layer, a second metal layer, an insulation layer disposed between the first metal layer and the second metal layer, and a coating layer covering the first metal layer and made of a material having a melting point higher than that of the first metal layer for avoiding a splash formed by the first metal layer in a melting state when the insulation layer is destroyed and the first metal layer is welded by the first laser.

Preferably, the first metal layer is made of aluminum and the coating layer is made of indium tin oxide.

Preferably, the second layer is made of chromium, molybdenum, tungsten molybdate or a combination thereof.

Preferably, the insulation layer is made of silicon nitride (SiN$_x$).

According to the present invention, there is proposed a linear structure of repairing defects applied in producing a liquid crystal display, wherein the liquid crystal display includes a pixel array formed by a plurality of scanning lines crossing with a plurality of data lines. The linear structure includes an essential repair line located on one side of the pixel array and used for intersecting with a defecting line to result in a first intersection point and with a normal line adjacent to the defecting line to result in a second intersection point, wherein the first and second intersection points are treated by a first laser to achieve electrical connection, and having a first breaking point and a second breaking point thereof cut by a second laser to achieve a broken circuit, wherein the first and second intersection points are located two sides of a line segment constructed by the first and second intersection points respectively.

Preferably, both the defecting line and the normal line are data lines. Certainly, both the defecting line and the normal line can be scanning lines.

Preferably, the first laser has a wavelength of 1064 nm and the second laser has a wavelength of 532 nm.

Preferably, the essential repair line includes a first metal layer, a second metal layer, an insulation layer disposed between the first metal layer and the second metal layer, and a coating layer covering the first metal layer and made of a material having a melting point higher than that of the first metal layer for avoiding a splash formed by the first metal layer in a melting state when the insulation layer is destroyed and the first metal layer is welded by the first laser.

Preferably, the first metal layer is made of aluminum and the coating layer is made of indium tin oxide.

Preferably, the second layer is made of chromium, molybdenum, tungsten molybdate or a combination thereof.

Preferably, the insulation layer is made of silicon nitride (SiN$_x$).

According to the present invention, there is proposed a repair structure used in a liquid crystal display for being welded by a laser. The repair structure includes a first metal layer, a second metal layer, an insulation layer disposed between the first metal layer and the second metal layer, and a coating layer covering the first metal layer and made of a material having a melting point higher than that of the first metal layer for avoiding a splash formed by the first metal layer in a melting state when the insulation layer is destroyed and the first metal layer is welded by the laser.

Preferably, the first metal layer is made of aluminum and the coating layer is made of indium tin oxide.

Preferably, the second layer is made of chromium, molybdenum, tungsten molybdate or a combination thereof.

Preferably, the insulation layer is made of silicon nitride (SiN$_x$).

Preferably, the repair structure is an essential repair line for repairing defects in producing a liquid crystal display including a pixel array formed by a plurality of scanning lines crossing with a plurality of data lines. Preferably, the essential repair line is located on one side of the pixel array and used for intersecting with a defecting line to result in a first intersection point and with a normal line adjacent to the defecting line to result in a second intersection point, wherein the first and second intersection points are treated by the laser to repair the defects. Preferably, both the defecting line and the normal line are data lines. Preferably, both the defecting line and the normal line are scanning lines.

The present invention may best be understood through the following description with reference to the accompanying drawings, in which:

DETAILED DESCRIPTION OF THE PREFERRED EMBODIMENTS

Figure 1:
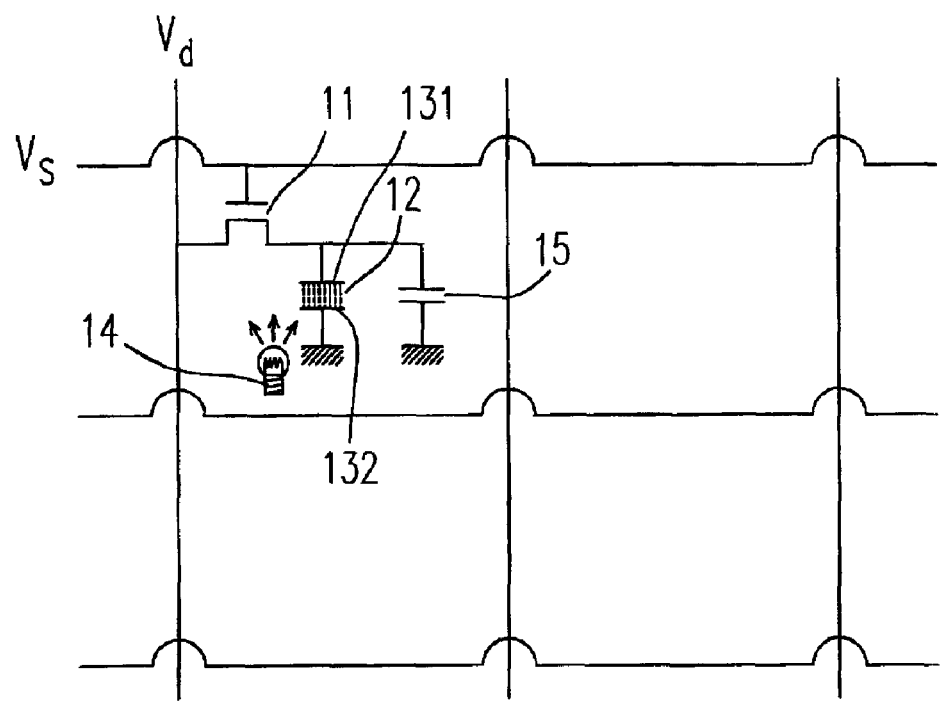
FIG. 1 is a diagram illustrating a unit circuit block of a thin film transistor liquid crystal display (TFTLCD) according to the prior art.
Figure 2:
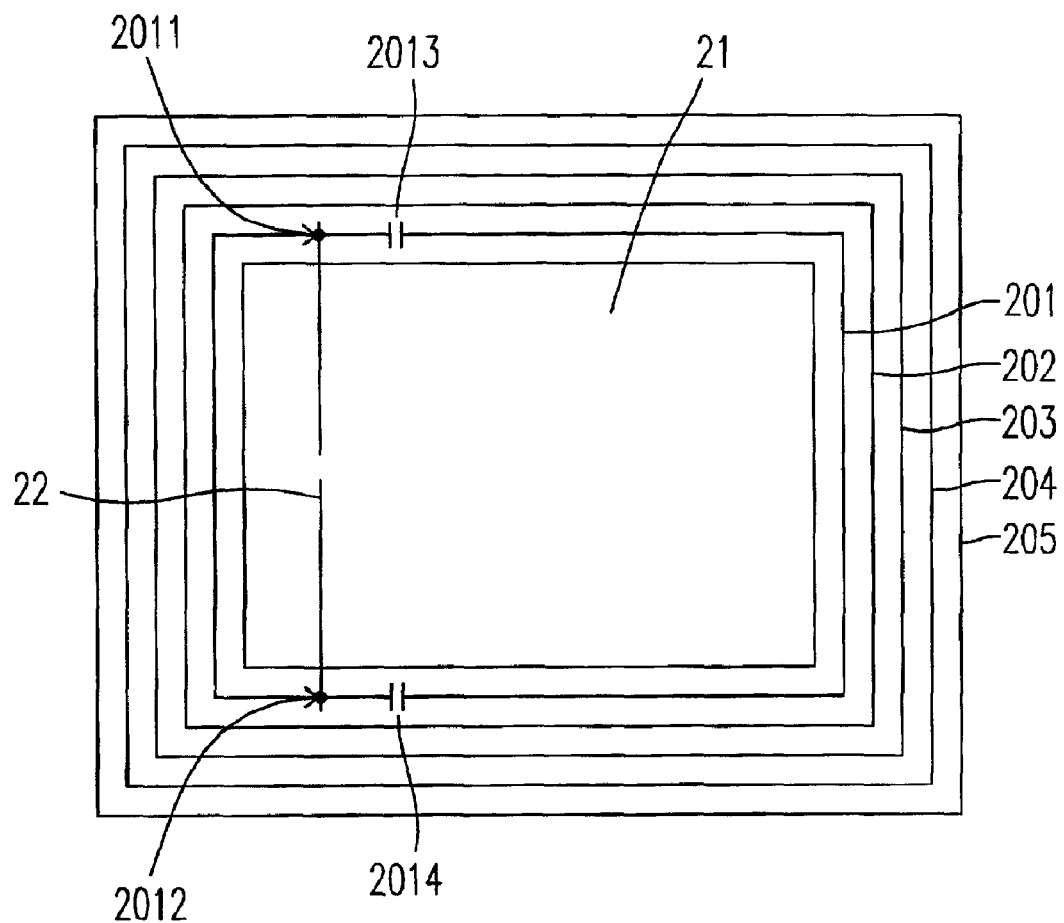
FIG. 2 is a top view illustrating a structure having a plurality of annular repair lines around an array of the thin film transistor liquid crystal display according to the prior art.
Figure 3A:
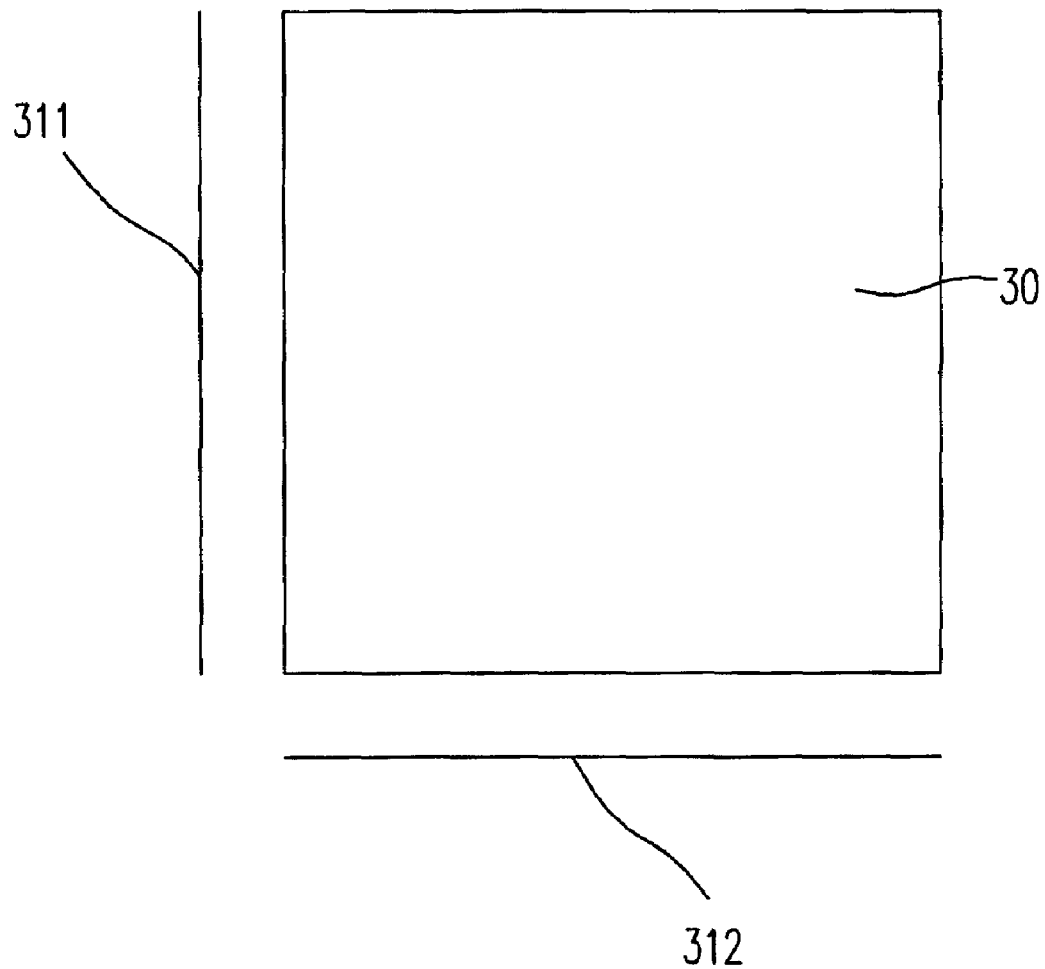
FIG. 3A is a diagram illustrating a layout structure according to a preferred embodiment of the present invention.

As shown in FIG. 3A, a rectangle pixel array 30 of the liquid crystal display has a plurality of scanning lines (not shown) and a plurality of data lines (not shown). The present invention provides a repair line 311, 312 located outside of the rectangle pixel array 30, e.g. at one end of the scanning lines or the data lines, for achieving the structure of repairing defects.

During the typical production of the thin film transistor liquid crystal display, generally the scanning lines are finished by the first photolithography and etching process. However, the data lines are finished by the third or fourth photolithography and etching process. Thus, the defect probability of the scanning line is lower than that of the data line. In addition, if a defect occurred in the scanning line, the scanning line can be re-worked immediately because the process is earlier process.

Figure 3B:
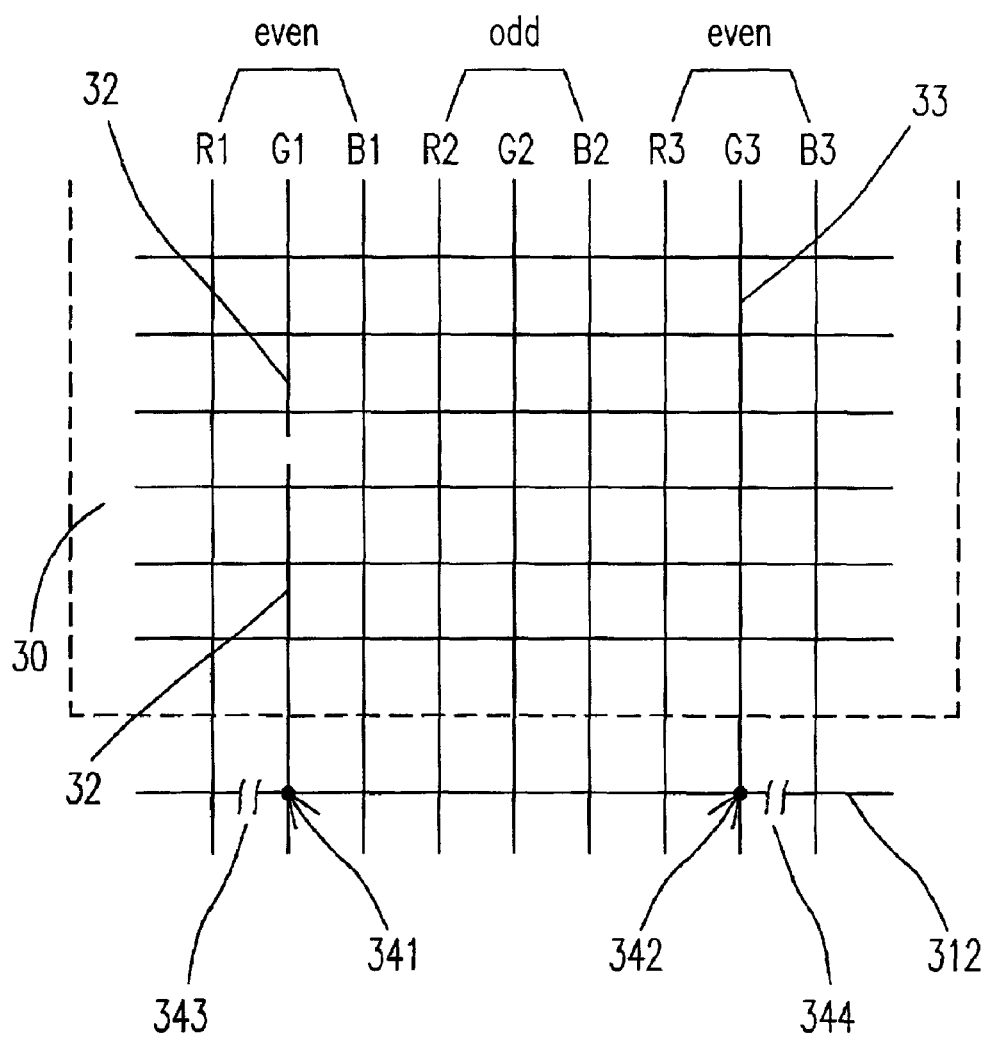
FIG. 3B is a diagram illustrating a portion of the layout structure according to the preferred embodiment of the present invention.
Figure 4:
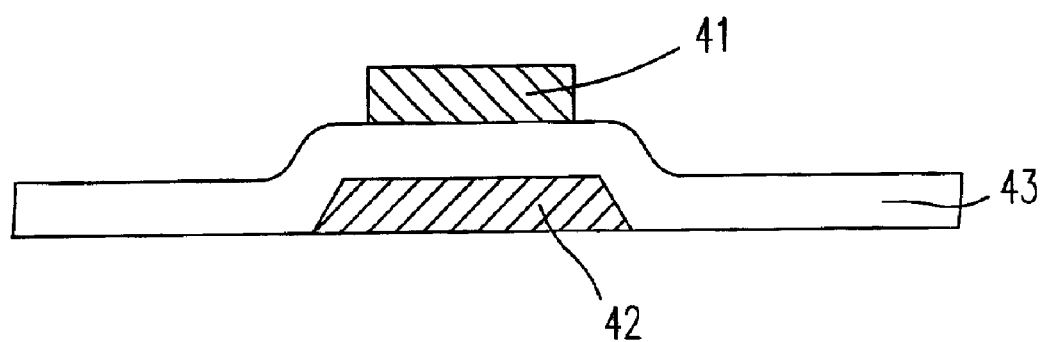
FIG. 4 is a schematic view illustrating a repair structure according to a prior art.

The present invention provides a process for repairing defects of a thin film transistor liquid crystal display. Referring to FIG. 3B, a defecting data line 32 is occurred in a portion of layout structure. The process for repairing the defect data line 32 is performed by welding a first intersection point 341 of the defecting data line 32 and the repair line 312 and a second intersection point 342 of a normal data line 33 adjacent to the defecting data line 32 and the repair line 312 by a first laser to achieve electrical connection, and then cutting a first breaking point 343 and a second breaking point 344 of the repair line 312 by a second laser to achieve a broken circuit. As shown in FIG. 3B, the first and second intersection points 343 and 344 are located two sides of a line segment constructed by the first and second intersection points 341 and 342 respectively. Thus, a signal of the normal data line 33 can pass the second intersection point 342 and the first intersection point 341 to repair the defecting data line 32. In addition, the wavelength of the first laser is preferably 1064 nm while the wavelength of second laser, which requires higher energy, is preferably 532 nm.

The selection of the normal data line 33 adjacent to the defecting data line 32 is in accordance with the transmission of the driving system. Generally, for a set of three primary colors (RGB) and even/odd transmission, the normal data line 33 having the same primary color and the same even (or odd) is preferably selected as shown in FIG. 3B.

Moreover, the process for repairing a defecting scanning line is the same as that for repairing the defecting data line. Therefore, it won't be described again.

Figure 5:
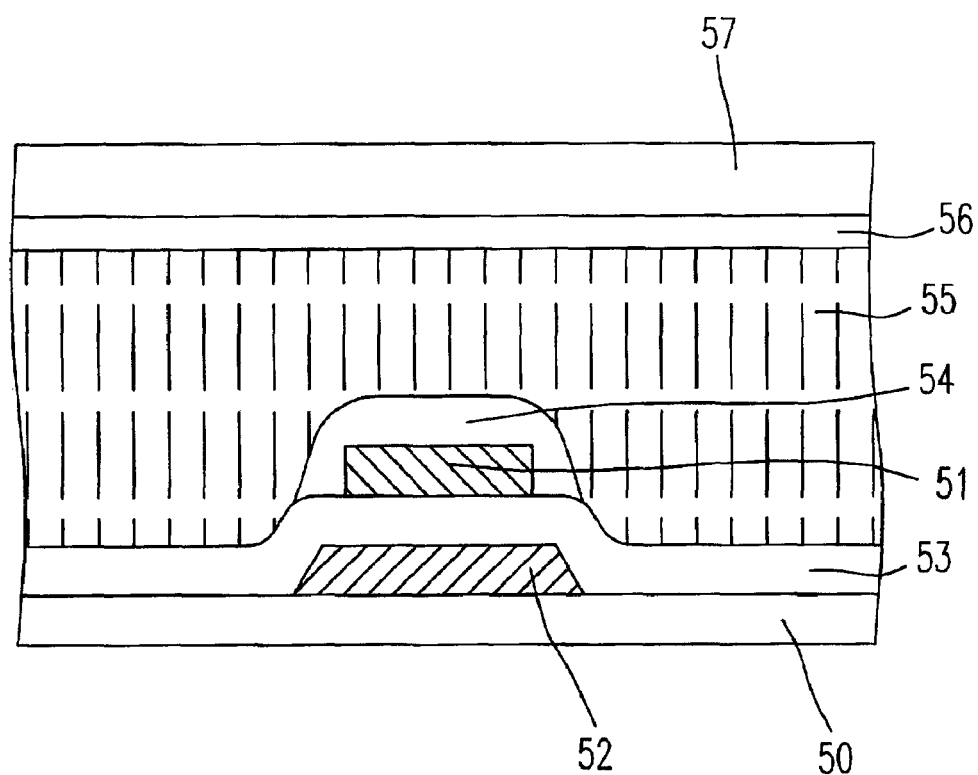
FIG. 5 is a schematic view illustrating a repair structure according to a preferred embodiment of the present invention.

In addition, the repair line includes a second metal layer 52, an insulation layer 53, and a first metal layer 51 formed in sequence on a glass substrate 50 as shown in FIG. 5. A coating layer 54 is made of a material having a higher melting point than the first metal layer 51. Furthermore, a liquid crystal 55 and a color filter 56 are disposed between the second metal layer 52 and a second glass substrate 57.

When a defect of the LCD is found, the insulation layer 53 is destroyed by a laser and the first metal layer 51 is burned to melt. Subsequently, the first metal layer 51 is welded with the second metal layer 52 to accomplish the repair. In the meantime, the coating layer 54 could avoid a splash formed by the first metal layer 51 which is in a melting state. Furthermore, the undesirable contact such as a short circuit, a broken circuit, or a Schottky contact could be avoided.

According to the present invention, the first metal layer 51 is made of aluminum, and the insulation layer 53 is made of silicon nitride ($SiN_x$). In addition, the coating layer 54 is made of indium tin oxide. The melting point of indium tin oxide is about 1000° C. which much higher than the melting point of aluminum (550~660° C.), so the coating layer 54 is preferably made of indium tin oxide.

According to the present invention, the second metal layer 52 is made of a conducting material having a melting point much higher than 1000° C. selected from a group consisting of chromium, molybdenum, tungsten molybdate and the combination thereof.

The wavelength of the laser is preferred 1064 nanometer. The intensity of the laser is preferred low energy. Certainly, the repair structure could be inverted, so the second glass substrate 57 is in the bottom and the first glass substrate 50 is on the top. The laser passes from the first glass substrate 50 inward to the repair structure.

According to the present invention, the coating layer 54 coating on the first metal layer 51 could effectively avoid the splashing. Furthermore, the proper wavelength and intensity of the laser could make a good ohmic contact between the first metal layer 51 and the second metal layer 52.

In sum, the present invention discloses a process for repairing the defect occurred in the data or scanning lines. Furthermore, the present invention provides the following advantages:

(1) Comparing with the prior art, the signal transmission line will be efficiently shortened after finishing repairing according to the present invention. Thus, the present invention can decrease the RC time delay phenomenon.

(2) The repair line according to the present invention can be used for repairing multiple defecting lines. Furthermore, a large area of panel is not necessary to move for performing the repairing action. Therefore, the production efficiency will be increased.

(3) The structure of the repair line does not occupy too much area, so the utility rate of glass substrate in the liquid crystal display can be efficiently increased.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for repairing defects applied in producing a liquid crystal display, wherein said liquid crystal display comprises a pixel array formed by a plurality of scanning lines crossing with a plurality of data lines, comprising steps of:

(a) providing an essential repair line located on one side of said pixel array;

(b) welding a first intersection point of a defecting line and said essential repair line and a second intersection point of a normal line adjacent to said defecting line and said essential repair line by a first laser to achieve electrical connection; and (c) cutting a first breaking point and a second breaking point of said essential repair line by a second laser to achieve a broken circuit, wherein said first and second intersection points are located two sides of a line segment constructed by said first and second intersection points respectively.

2. The process according to claim 1, wherein both said defecting line and said normal line are data lines.

3. The process according to claim 1, wherein both said defecting line and said normal line are scanning lines.

4. The process according to claim 1, wherein said first laser has a wavelength of 1064 nm and said second laser has a wavelength of 532 nm.

5. The process according to claim 1, wherein said essential repair line comprises:

a first metal layer;

a second metal layer;

an insulation layer disposed between said first metal layer and said second metal layer; and a coating layer covering said first metal layer and made of a material having a melting point higher than that of said first metal layer for avoiding a splash formed by said first metal layer in a melting state when said insulation layer is destroyed and said first metal layer is welded by said first laser.

6. The process according to claim 5, wherein said first metal layer is made of aluminum.

7. The process according to claim 5, wherein said coating layer is made of indium tin oxide.

8. The process according to claim 5, wherein said second layer is made of a material selected from a group consisting of chromium, molybdenum, tungsten molybdate and a combination thereof.

9. The process according to claim 5, wherein said insulation layer is made of silicon nitride ($SiN_x$).

* * * * *